United States Patent
Saboff et al.

(10) Patent No.: US 6,185,734 B1
(45) Date of Patent: Feb. 6, 2001

(54) HIERARCHICAL REGISTRY STRUCTURE FOR MANAGING MULTIPLE VERSIONS OF SOFTWARE COMPONENTS

(75) Inventors: Michael L. Saboff, San Jose, CA (US); Andrew Maag, Austin, TX (US); Alan McGowen, San Jose, CA (US)

(73) Assignee: Hewlett-Packard Company, Palo Alto, CA (US)

(*) Notice: Under 35 U.S.C. 154(b), the term of this patent shall be extended for 0 days.

(21) Appl. No.: 09/120,037

(22) Filed: Jul. 21, 1998

(51) Int. Cl.$^7$ ..................................................... G06F 9/445
(52) U.S. Cl. ............................................... 717/11; 707/203
(58) Field of Search ................................... 707/200–203, 707/100; 717/10, 11

(56) References Cited

U.S. PATENT DOCUMENTS

| | | | |
|---|---|---|---|
| 5,375,241 | * 12/1994 | Walsh | 709/305 |
| 5,613,101 | * 3/1997 | Lillich | 709/230 |
| 5,634,114 | * 5/1997 | Shipley | 395/500 |
| 5,819,295 | * 10/1998 | Nakagawa et al. | 707/203 |
| 5,835,749 | * 11/1998 | Cobb | 709/305 |
| 5,835,911 | * 11/1998 | Nakagawa et al. | 707/203 |
| 5,956,513 | * 9/1999 | McLain, Jr. | 395/705 |

OTHER PUBLICATIONS

Crowl et al., "A common library interface to shared-memory multiprocessors", IEEE 1994, pp. 595–604.*

Watts et al., "SCPlib: A concurrent programming library for programming Heterogeneous networks of computers", IEEE, 1998, pp 153–156.*

* cited by examiner

Primary Examiner—Kakali Chaki (57) ABSTRACT

The invention describes a hierarchical registry for allowing multiple applications to use different versions of a software component on the same system. Each version of a software component has a base entry in the registry. Each base entry has rules, one of which must be met to use version of the software component corresponding to that base entry. The registry may also have a default base entry, which is used if no other base entry has one of its rules met. Each rule may have several criteria, all of which must be met to satisfy that rule. Each base entry may be marked as deleted rendering the corresponding version of the software component inaccessible except by applications currently accessing the version marked as deleted.

28 Claims, 5 Drawing Sheets

Fields in Registry Data Structures

| FIELD NAME | PURPOSE |
| --- | --- |
| 500—Base | (For rule entries) Pointer to base entry |
| 501—Criteria | Selection criteria for rules under a base entry |
| 502—Criteria Type | Type of rule - match user, group, process ID or variable value |
| 503—Criteria Value | Value to match for criteria to be satisfied |
| 504—Dependencies | The other services and their extensions that this service depends on |
| 505—Extensions | Additional capabilities provided by this version of the service. Provided as a list of extension UUID's |
| 506—ID | Unique ID for the base capabilities of the service |
| 507—Path | Location in the filing system for the file providing the service an ("implementation library") |
| 508—Rules | (For base entries) Pointer to linked list of sub rules under this base entry |
| 509—Service | The abstract name of the service provided by the registry entry. |
| 510—State | State of this entry -Default, Active, Inactive or Deleted |
| 511—Type | Type of entry -Library, Rule, Program, etc. |
| 512—UUID | Universal Unique IDentifier -128 bit unique value |
| 513—Version | System relative version of the service |
| 514—Prerequisite | The previous version, if any, of the software library that must have already be used by the application. Used to track incremental updates to a library. |

HIERARCHICAL REGISTRY STRUCTURE FOR MANAGING MULTIPLE VERSIONS OF SOFTWARE COMPONENTS

BACKGROUND OF THE INVENTION

This invention relates generally to replacing software components in a computer system and more particularly to managing multiple versions of a software component.

Most software applications use software libraries, a group of software routines collected together, usually for a related purpose. The purpose of the library can be said to be the library's "service". Software libraries are made available to a software application through the use of a linker. A linker has the task of combining a series of independently compiled or assembled program routines into a single module (the executable program). Libraries are incorporated into the executable program by one of two linking methods: a library can either be statically linked or dynamically linked to the application. When a library is statically linked, the library or library routine is made part of the executable program during the link. Therefore any modifications to a statically linked library would require a new executable program to be built by the linker.

A dynamically linked library exists, on the other hand, outside of the executable program. At link time the linker must know all of the external references of a library, such as the names of the routines available, but does not need to know the actual contents of the library itself, or even its location. It is not until run-time that the program must be able to determine the location of the library. Determining the location of the library at runtime is known as "runtime binding". Therefore a dynamically linked library is free to change everything except its interface definition up until the time it is executed.

However, dynamic linking does not, by itself, provide true dynamic updating. It does not allow for changing a reference to an external procedure during a run after the references have been established. The binding takes place at or before the first time a procedure is invoked. Subsequent references are not typically rebound. Even if the external reference is resolved every time the external procedure is called, dynamic linking is ineffective because it does not allow replacing a software component while that component is being executed. Also, changing libraries by dynamic linking does not keep track of the "state" of the library from the old version to the new version. When the new version is in place, it does not know the state of the library data structures or other state data that the old version had created. This will lead to an update that is unreliable to the user.

To be able to use more than one version of a software library, there must be a way to keep track of which application uses which software library. When a software library is available as a dynamically linked library, an application cannot distinguish between multiple versions of a software library. An application run-time binds to the first version of a software library that it identifies. Therefore, the only way to update to a new version of a dynamically linked library is to make a system-wide switch to the new version of the library, i.e., delete the old version. All applications then upgrade to the new version of the software library. This method involves halting all applications, installing the new version of the library, and restarting the applications, which will now bind to the new version. This method requires all applications on a system to use the same version of the library.

To overcome the problem of an application being unable to determine which version of a software library to runtime bind to, each application can be statically linked directly to its own version of a software library. This removes any ambiguity over which version of the library to use. However, changing a version of the software library used by the application requires the application to be re-linked to the new version of the software library. The application process running with the old version of the software library must be stopped or completed before a new application process with the new version of the software library can be started.

In addition to the inconvenience of halting the application so as to restart using the new version of the library, there are several other disadvantages with this method. Unlike dynamic linking, which involves updating to a new dynamically linked library, static linking to libraries requires linking to the unlinked objects that make up the library. Libraries are often provided by vendors, who generally do not provide the unlinked compiled objects of the library to the end-user for re-linking. Instead vendors usually provide a new dynamic library. Also, in a static link, the location of the library is fixed as of the time of the link. Lastly, this method can be difficult to manage, since it is difficult to tell which version of the library is being used by which application.

Therefore, there is a need for a system and a method for managing the update of a library in a system without requiring the halting of applications using the library.

Further, there is a need to manage such a system to allow for multiple applications to each potentially use its own version of a software library.

Further, there is a need to manage this system in an easy to use and flexible method.

SUMMARY OF THE INVENTION

The present invention provides a system and a method to manage changes in the versions of a software component and to allow for the use of different versions of a software component by different applications. A centralized hierarchical registry (the registry) is implemented to track which version of a software component each application currently uses.

The commonly assigned application Ser. No. 09/120,040 filed Jul. 21, 1998 and entitled SYSTEM AND METHOD FOR ON-LINE REPLACEMENT OF SOFTWARE describes a system and method of replacing libraries on-the-fly, where the application and a replaceable "implementation" library must not be linked or run-time bound to each other. The application, instead, is linked to an "interface library" that contains proxy interfaces for all routines found in the implementation library. The interface library can, at run-time, determine the location of the implementation library. The system and method of replacing libraries on-the-fly allows for replacing libraries without restarting the application. In the described embodiment of the invention, the registry is used to keep track of multiple versions of the implementation libraries. However, the techniques described herein may be used to keep track of multiple versions of any software component, other than a software library, such as a software procedure or an entire software program. Regardless of the software component type, all versions of a software component have a "service" that they provide. The user of the service, such as an application program, uses a particular version of that service, depending on the conditions of the application and the state of the version of the software service.

The invention allows for several versions of a software library to be used by several different applications within the same system. An application can be updated to a new version of the library without re-linking to the library or restarting. A hierarchical registry, according to the present invention, is easy to manage due to its centralized nature. The invention also allows for great flexibility in the management of multiple libraries by offering the freedom for libraries to be deleted and updated on the fly without impacting applications.

In the presently preferred embodiment, each version of a software library has a corresponding base entry in the registry. Generally, one base entry identifies a default software library to be used by an application calling the library's service, while one additional base entry exists for each additional version of a library service. Any base entry may have rules, each rule defining the conditions that must be met for an application to use the corresponding version of the software library. A base entry may have more than one rule or no rules at all. If there is more than one rule for a base entry, satisfaction of any rule meets the conditions to use that base entry. Typically, a default base entry will not have any rules and will be used when no other entry for a library service has its designated conditions met. A default entry may have rules, which if satisfied trigger the use of the default base entry. If no other base entries have their rules met, the default entry is used even if its rules aren't met. Each rule contains one or more criteria defining the rule. For a rule to be met, all of its criteria must be met.

When an application calls a service provided by a software library, the registry is queried to determine which version of the library to use. Each base entry that provides the requested service is checked to see if its rules are met. If the application fails to satisfy any of the base entries with rule entries, the default is used.

The hierarchical registry data structures and methodologies of the present invention thus permits different users, groups, processes or environments to use different versions of the same library simultaneously. This can be done without relinking any applications. It further allows the use of debuggable, profiling, or experimental libraries for a particular user, group, process, or environment without disrupting or degrading the performance of other users, groups, processes, or environments on the system.

There are additional benefits of the present invention. Since the present invention allows the use of libraries without relinking, it enables the use of a different library for an application even when the customer or user may not have the unlinked objects to the application available. The library no longer needs to be in a predetermined place in the file system; it can be moved around even after the application is linked. The hierarchical registry also simplifies system administration. With the hierarchical library registry, it becomes easy for an administrator to see which libraries will be used by various applications because this information resides in a central location. Additionally, a system that employs the present invention does not require a system-wide change to a library. This allows more flexibility in the design, usage and deployment of libraries. While the invention is described in the context of managing libraries, it can more broadly be used for managing all sorts of software components and services, beyond those traditionally referred to as libraries.

A hierarchical registry has several conceived uses.

The use of the registry could allow for the creation of a "smart" debugger. A Library compiled and linked with debug capabilities is slower and uses more memory than the same library built without debug capabilities. If a specific process, using the library, wishes to debug software within a particular library, the registry can be used to keep track of both a debug and a non-debug version of the library. When the specific process that wishes to use the debug version of the library accesses the registry, the registry will direct that process, and only that process, to the debug version of the library, while all other processes can continue to use the non-debug version of the library.

The use of the registry can also be effective in the use of profiling a library. A process uses a profiling version of the library, which will operate slower than a non-profiling version of a library, for the short period of time that a profile is run. The non-profiling version will be used after the profile of the user process. The results of the profile can be used to generate an improved version of the library. The registry can be used for keeping track of the switching between the profile, non-profile and improved versions of the library.

The registry may also used to allow selection of a version of the library offering a specific feature. For example, multiple versions of a library may exist that are language specific. Depending on the language selection of the user, the registry will select the proper version of the library. In a second example, the program may wish to output data, but may not know until the time of execution whether to send the data to a printer, file or to a fax modem. The program need only call a library service called "OutputData". The registry is thus arranged to allow for the selection of a version of the library based upon the system setup or user selection.

The foregoing and other objects, features and advantages of the invention will become more readily apparent from the following detailed description of a preferred embodiment, which proceeds with reference to the drawings.

DETAILED DESCRIPTION OF A PREFERRED EMBODIMENT

Figure 1:
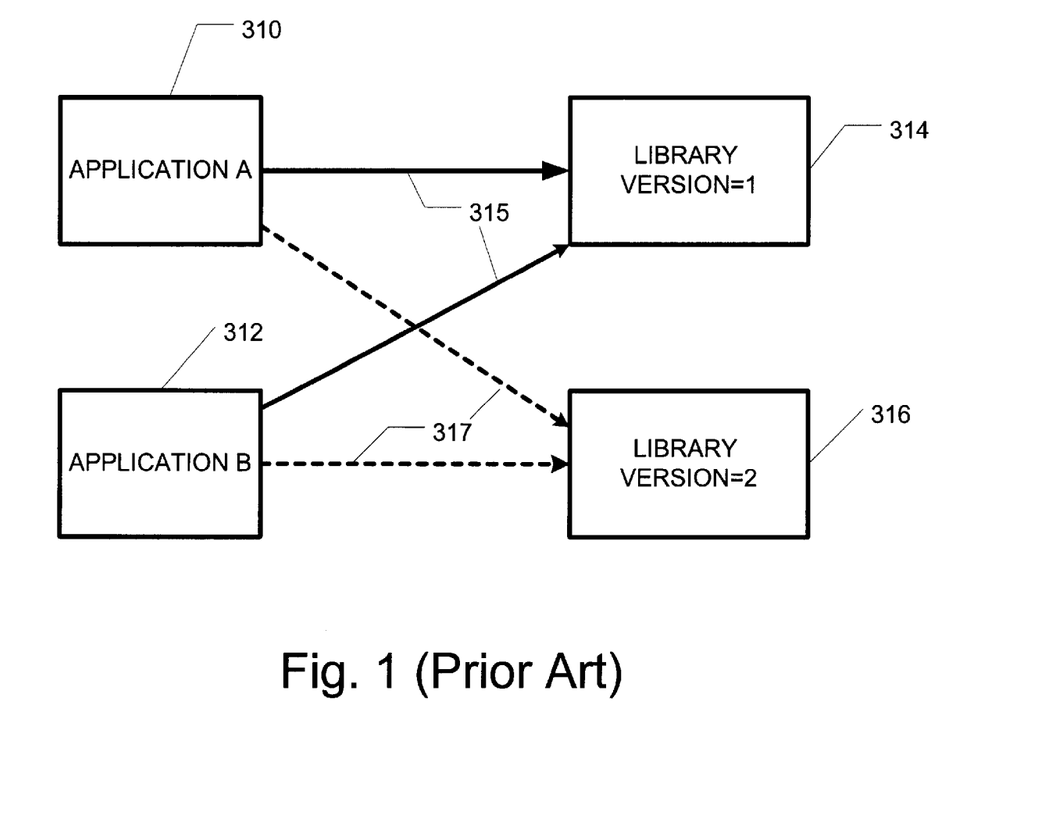
FIG. 1 is a block diagram showing a prior art method of managing multiple versions of a software library.

FIG. 1 is a block diagram showing a prior art method of managing multiple versions of a software library. Under this scheme of managing multiple versions of a software library, applications are dynamically linked to software libraries. All applications must use the same version of the dynamic linked library. In the diagram, Application A 310 and Application B 312 both use version 1 of the software library 314, as indicated by the solid arrows 315. If a second version of the software library is established on the system, it is ambiguous which version of the software library for each application to use. To use the second version of the software library 316, the second version will have to replace the first version of the software library 314 and both Application A and Application B will have to use version 2 of the software library 316, as indicated by the dashed lines 317.

Figure 2:
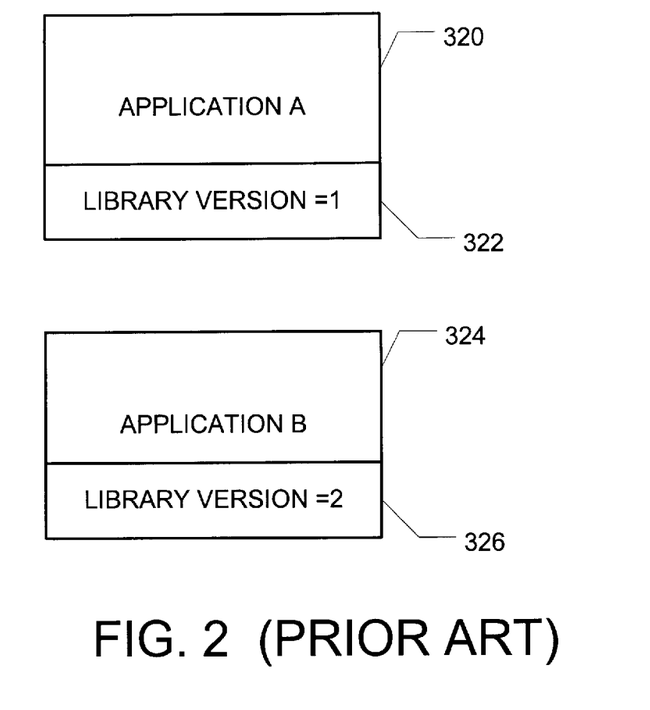
FIG. 2 is a block diagram showing a second prior art method of managing multiple versions of a software library.

FIG. 2 is a block diagram showing a second prior art method of managing multiple versions of a software library. Another method in the prior art of managing multiple versions of a library is statically linking the software library used by each application directly to the application. This method strictly specifies which library version is used by which application. But it is very inflexible because it forces a re-link with a new version of the library for every version change to an application. In the diagram, Application A 320 is statically linked with version 1 of the software library 322. Application B 324 is statically linked with version 2 of the software library 326. If Application A 320 would upgrade to version 2 of the software library 326, Application A must be re-linked with its own copy of version 2 of the software library 326, requiring the halting of Application A.

Figure 3:
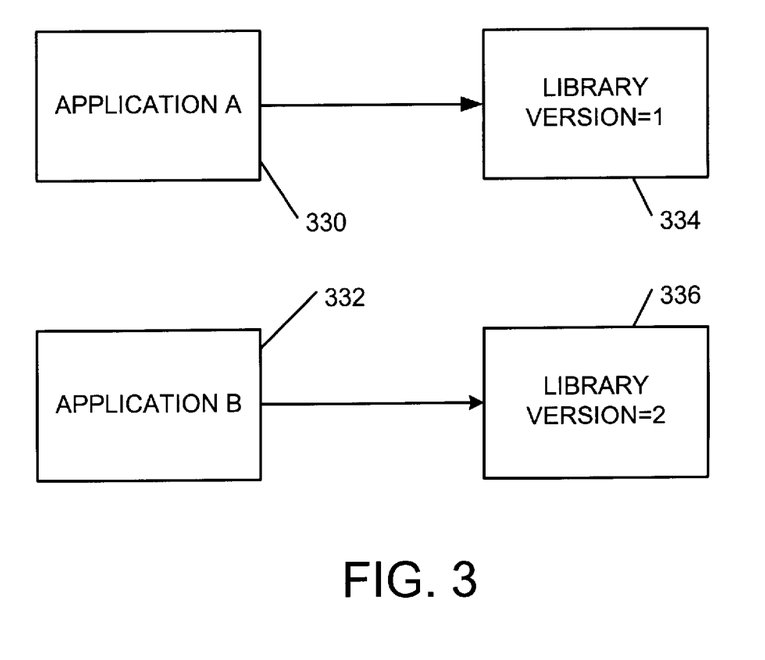
FIG. 3 is a block diagram showing a method used by the present invention for managing multiple versions of a software library.

FIG. 3 is a block diagram showing a method used by the present invention for managing multiple versions of a software library. In this system each application can use its own version of the library. In the diagram, Application A 330 uses version 1 of the software library 334. Application B 332 uses version 2 of the software library 336.

Figure 4:
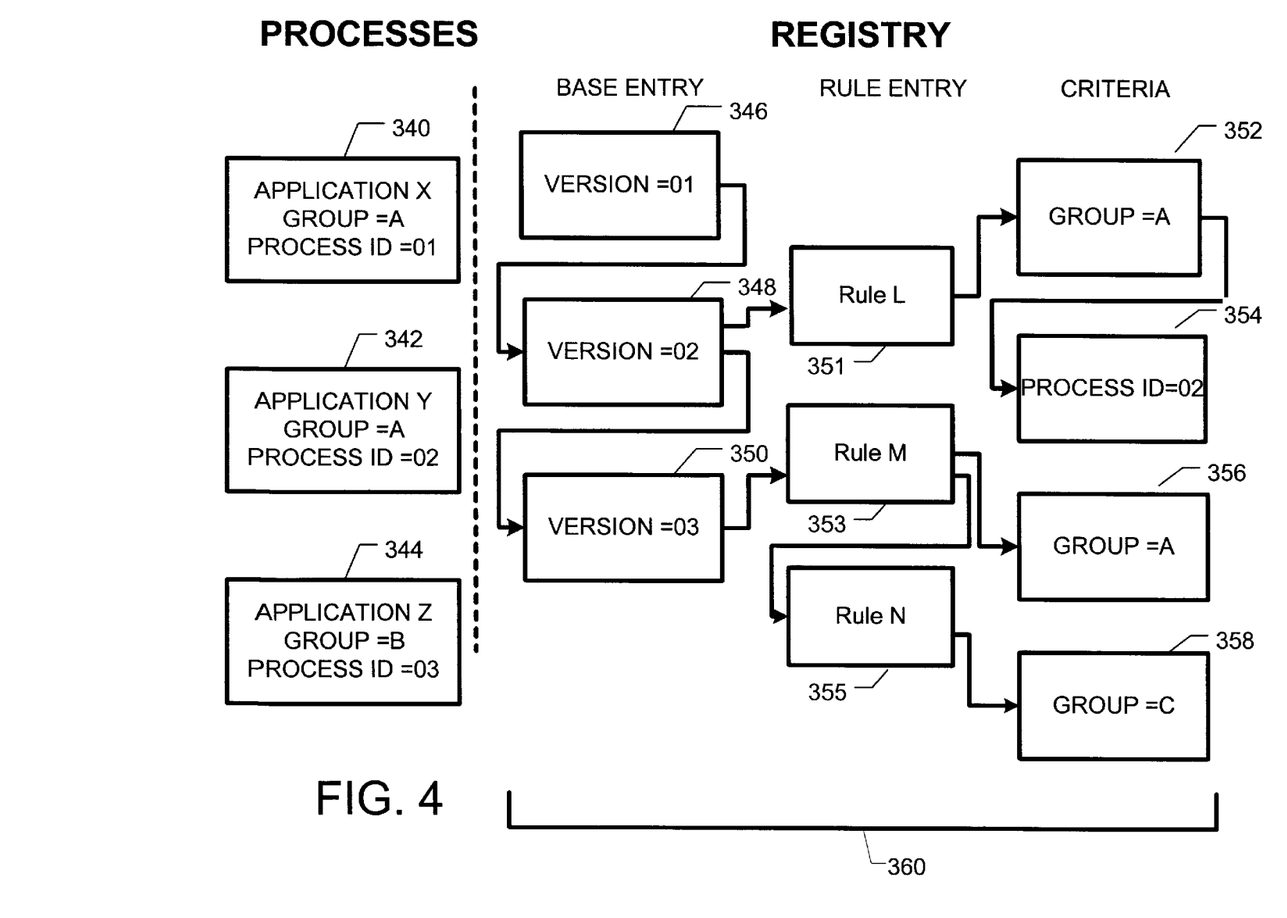
FIG. 4 is a block diagram showing the use of the hierarchical registry according to the present invention to manage multiple versions of a software library.

FIG. 4 is a block diagram showing the use of a hierarchical registry according to the present invention to manage multiple versions of a software library. To keep track of which application uses which version of the software a hierarchical registry 360 is used. The hierarchical registry 360 is made up of one base entry for every version of the software library service plus any rules used to select the desired version of the software library. Each rule includes one or more associated criteria that determine when the corresponding version of the software library is to be used. If all the associated criteria of a rule are met, then the version of the software library corresponding to that rule is used. Typically there will be a default version of the software library that has no rule associated with it. If no alternate base entry has any of its rules, the application will use the default version of the software. In the diagram, there are three applications and three different versions of the software library. Application X 340 is a member of group A and has a process ID of 1. Application Y 342 is a member of group A and has a process ID of 2. Application Z 344 is a member of group B and has a process ID of 3. Each application will access the hierarchical registry 360 to determine which version of the software library it will use.

A request is made from Application X 340 to the hierarchical registry 360 to determine the version of the software library for it to use. There are three base entries offering the software library service. The first base entry 346 represents the default version and has no rules associated with it. The second base entry 348 has one rule, Rule L 351, associated with it. Rule L has two criteria: the first criteria 352 indicates that to use the second base entry 348, the calling application must be from group A; while the second criteria 354 requires that the calling application have a process ID of 1. Since Application X meets both of the criteria for the second base entry 348, the version associated with the second base entry 348 is used. In this case the second base entry 348 is associated with version 2 of the software library. Application X 340 will therefore use version 2 of the software library.

A request is made from Application Y 342 to the hierarchical registry 360 to determine the version of the software library for it to use. There are three base entries offering the software library service. The first base entry 346 represents the default version and has no rules associated with it. The second base entry 348 has one rule, Rule L 351, associated with it. Rule L has two criteria: the first criteria 352 indicates that to use the second base entry 348, the calling application must be from group A; while the second criteria 354 requires that the calling application have a process ID of 1. Though Application Y 342 meets the first criterion of the rule entry it does not meet the second criterion. Therefore, the hierarchical registry keeps checking, proceeding to the third base entry 350. The third base entry 350 has two rules associated with it, Rule M 353 and Rule N 355. If either of the rules are satisfied, then the third base entry 350 is the desired version of the software library. Rule M 353 has one criterion 356, that the application using it is from group A. Since Application Y meets the sole criterion for at least one of the rules of the third base entry 350, the library version associated with the third base entry 350 is used. In this case the third base entry 350 is associated with version 3 of the software library. Application Y 342 will therefore use version 3 of the software library.

A request is made from Application Z 344 to the hierarchical registry 360 to determine the version of the software library for it to use. There are three base entries offering the software library service. The first base entry 346 represents the default version and has no rules associated with it. The second base entry 348 has one rule, Rule L351, associated with it. Rule L 351 has two criteria: the first criteria 352 indicates that to use the second base entry 348, the calling application must be from group A; while the second criteria 354 requires that the calling application have a process ID of 1. Application Z 344 meets neither of the criterion of Rule L 351. Therefore, the hierarchical registry keeps checking, proceeding to the third base entry 350. The third base entry 350 has two rules associated with it, Rule M 353 and Rule N 355. If either of the rules are satisfied, then the third base entry 350 is the desired version of the software library. Rule M 353 has one criterion 356, that the application using it is from group A. Application Z fails to meet the criterion for the Rule M 353. Application Z 344 also fails to meet the sole criterion for Rule N 355, that the application come from group C. Since no rules associated with the third base entry 350 are met, it is not the desired version of the software service. Since there are no further base entries offering the desired software service, the default version identified by the first base entry 346 is used. Application Z 344 will therefore use version 1 of the software library.

Figure 5:
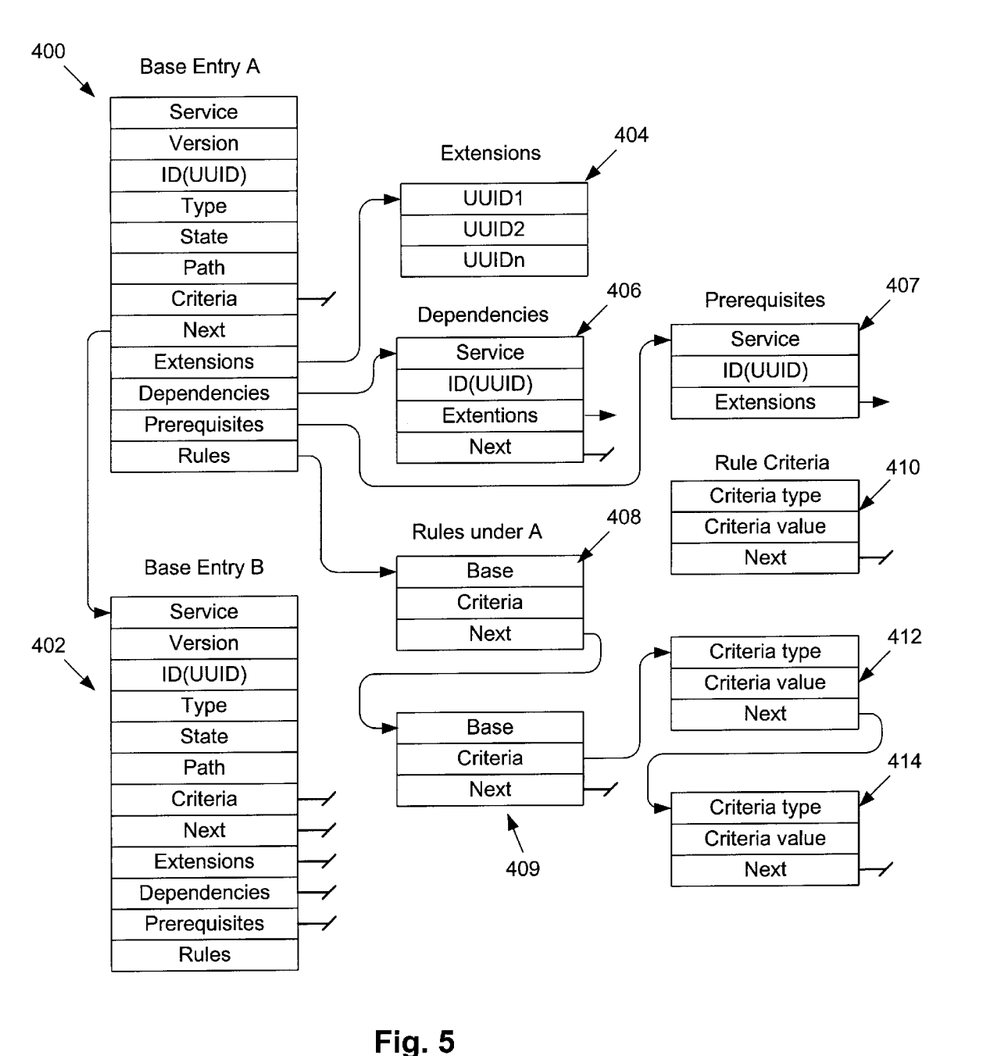
FIG. 5 is a diagram of the data structure of the elements of the hierarchical registry shown in FIG. 4.

FIG. 5 is a diagram of a sample data structure for implementing the hierarchical registry shown in FIG. 4. The hierarchical registry is comprised of several levels of linked lists. Other data structures for relating groups of objects could be used, but a presently preferred embodiment of the invention uses linked lists. The top level in the data structure is a linked list of all base entries. Each software library service has one or more corresponding base entries. The base entry contains information about each version of the software library providing the service. The information in the base entry includes the version number and the path in the file system for the corresponding version of the software library. Each base entry has a "rules pointer", pointing to a list of rules that apply to the base entry. If the "rules pointer" is null, there are no rules defining the use of that version of the software library.

The list of rules is the second level of linked lists. The list comprises one entry for each rule associated with a base entry. For example, if any one of four conditions could be met to use a version of the software library, then there would be four rule entries. However, if there are four conditions that must be met to use a version of the software library, there would be only one rule with four criteria. Each rule contains a pointer back to its base, the base entry that it applies to. Each rule has a "criteria pointer" pointing to the third level of link lists, the criteria necessary for using the version associated the rule entry. Every rule entry must have at least one rule criterion. A rule entry may have more than one rule criterion. For a rule entry to be selected, every criteria associated with the rule entry must be satisfied.

Each criteria entry contains a criteria defined by criteria type and criteria value fields. The criteria sets various restrictions on the use of the version of the software library associated with the rule entry. As examples, the criteria may be require the application to have a specific process ID; the criteria may require the application to be of a specific group of applications; or the criteria may require that only processes run by a specific user may use this version.

In the diagram of FIG. 5, there are two base entries: Base Entry A 400, and Base Entry B 402, each identifying a separate version of a software library service. Base Entry A 400 has two associated rule entries, a first rule 408 and a second rule 409. The first rule 408 has one rule criteria 410 associated with it, indicating a condition to be met to satisfy the first rule. The second rule 409 has two rule criteria 412, 414 associated with it, indicating two conditions to be met to satisfy the second rule. If the criteria for either the first or the second rules are met, then the software library version indicated in Base Entry A 400 is the desired version.

Base Entry B 402 has a null "rules pointer", indicating that there are no rule entries associated with it. Base Entry B 402, therefore, needs no special conditions to be met for its use. Provided that Base Entry B 402 indicates a usable version of the software library (that is, for example, that it has not been marked as inactive or deleted, as described later) it will be selected by applications that do not meet the rules imposed by Base Entry A 400. If there were several base entries that contain rules, the first base entry encountered that has one of its rules met will provide the service.

The hierarchical registry structure provides flexibility by providing links to software components related to an entry. These links may be extensions, dependencies or prerequisites. The extensions, dependencies and prerequisite links provide convenience to the user of the registry to find related software components. With multiple versions of software libraries available, the use of extensions, dependencies and prerequisites can avoid much confusion.

If the software library associated with an entry has additional capabilities available to a user of the service, the extensions pointer will point to an extensions list. The extensions list is a collection of unique identifiers of the files providing the additional capabilities. For example, the software library may provide for the trigonometry functions of sine and cosine. There may be an extended file that provides additional trigonometry functions of arcsine and arccosine. The extensions list for an entry will have an identifier for the file containing the arcsine and arccosine functions. Though each version of a software library could possibly have a different set of extensions, each new version of a software library would likely have all the extensions of the previous version. In FIG. 5, Base Entry A 400 has a set of extensions 404, containing unique identifiers for all additional capabilities provided by the service. Base entry B 402 has no extensions, so its extension pointer is null.

Each base entry may also have dependencies. Dependencies refer to software files that are used by the version of the software library indicated by the base entry and therefore must be loaded and present. The base entry includes a dependency pointer pointing to a dependency block. The dependency block includes the identifiers and the service names for the services that the base entry depends on. Each dependency has a next pointer that points to a subsequent dependency for the base entry, if any. A dependency may also have extensions for the additional capabilities required of the service. Though each version of a software library could possibly have different dependencies, each new version of a software library would likely have all the dependencies of the previous version. When an application replaces a library, all libraries that the replaced library depends upon are also replaced for the application. This ensures a consistent set of libraries for use by an application. In FIG. 15, Base Entry A 400 has a dependency 406, indicating a service that the base entry depends on. Base entry B 402 has no dependencies, so its dependency pointer is null.

Each base entry may also have a prerequisite. Prerequisites are used to track incremental updates of libraries. A library that is not an incremental update from a previous library will not have a prerequisite. A library that is incrementally built off of another library, or chain of libraries will have as a prerequisite the latest version of the library that the application must have already loaded. For example, if version 3 of a library is designed to be updated only from version 2, which is designed to be updated from version 1, version 3 will have a prerequisite of 2. If an application is currently using version 1 of the library, an update to version 3 will not be allowed, because the application has never gone through the update to version 2. If however, version 3 was designed to be updated from version 1, version 3 will have a prerequisite of version 1 and an update from version 1 to version 3 for an application will be allowed. The prerequisite block contains a service name and a unique identifier indicating the prerequisite version of the library, if any. The prerequisite block also contains a pointer to extensions that list unique identifiers of files providing further capabilities of the prerequisite file.

Figure 6:
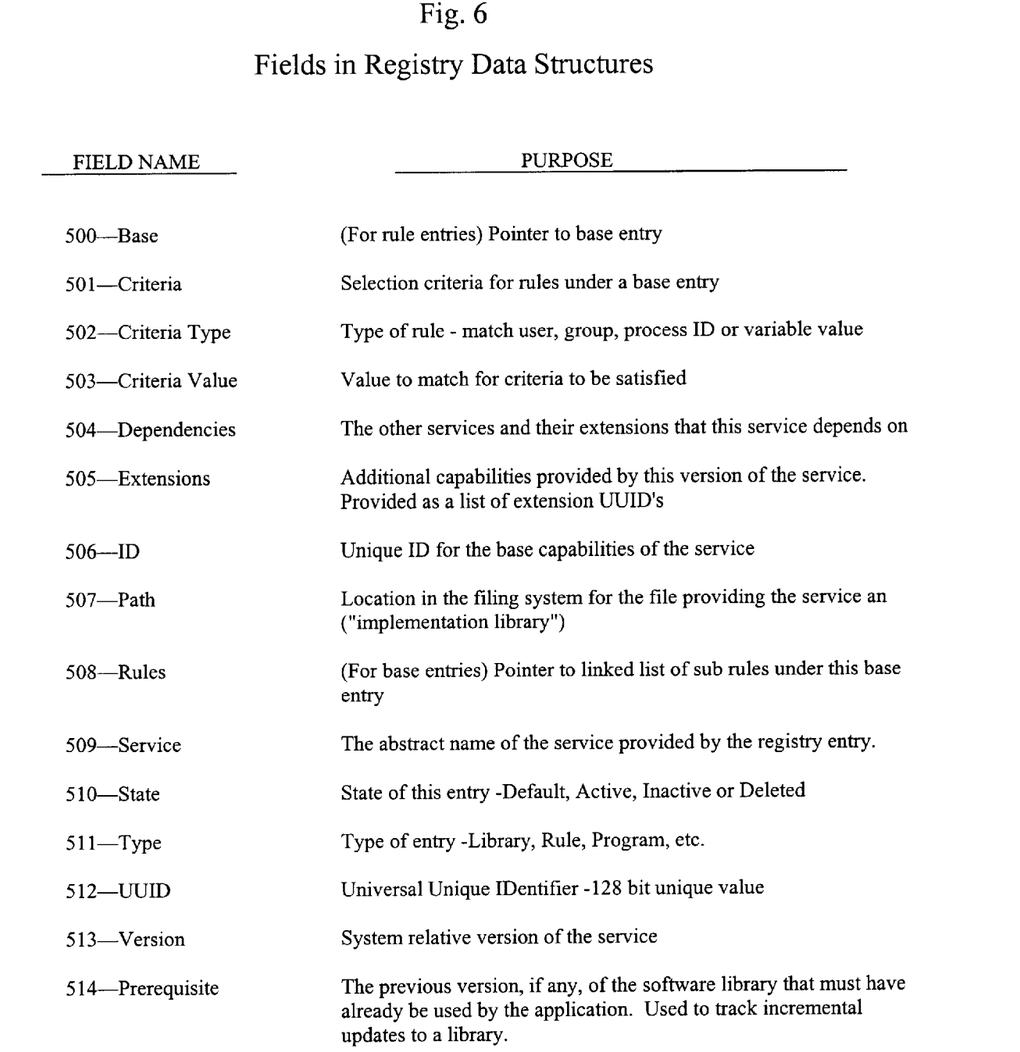
FIG. 6 is a table describing the fields of the data structure shown in FIG. 5.

FIG. 6 is a table describing the fields of the data structure shown in FIG. 5. There are five data structure types described in the invention: the base entry structure, the rule criteria structure, the extension structure, the prerequisite structure and the dependency structure, each described in turn below.

A rule structure has a base pointer 500, which is used by rule structures to point back to the corresponding base entry.

Criteria pointer 501 is used only by rule structures to point to rule criteria that must be met for the rule of a base entry to be satisfied. A rule will have at least one rule criteria.

Criteria type 502 indicates the type of rule that the rule criteria structure refers to. Possible types include, but are not limited to, a user id, a group id, a process ID or a variable value.

Criteria value 503 indicates the value that must be matched for the criteria to be met. The meaning of this criteria value is dependent upon the criteria type 502. For example, the criteria value indicates a process ID if the criteria type is set to a type of process ID.

Dependency pointer 504 is used by base entries. A dependency pointer points to a dependency structure indicating other files and their extensions that the entry depends on.

Extensions pointer 505 is used by base entries. Extension pointers can also be used in dependency structures and prerequisite structures. An extensions pointer 505 points to an extension structure indicating additional capabilities available for service provided in the entry, or described in the dependant service or the prerequisite service. Each extension in an extension structure is expressed as a unique identifier, such as a Universal Unique Identifier (UUID).

Identifier 506 is used by base entries to uniquely identify the service of the software library associated with the entry structure. Each identifier is a unique identifier, such as an Universal Unique Identifier (UUID).

Path 507 is used by base entries to indicate the location of the file providing the corresponding version of the service for this entry.

"Rules pointer" 508 is used only by base entries, to point to the first of the corresponding rules. If the base has no corresponding rules, the rules pointer is null.

Service 509 is used by base entries as well as by the dependency structure and the prerequisite structure. The service field indicates the abstract name of the service provided by the software library. All versions of a software library, including prerequisites for a software library, provide the same service, so the service field should match for all base entries and prerequisites associated with a software service.

State 510 is used by base entries indicating the state of the entry. Possible states include default, active, inactive or deleted. An entry will typically have a state of "active" or "default". When first loading a library onto the system and opening an entry in the registry for the library, the system administrator may wish to mark the library's entry state as "inactive" until it is ready for use. When a library is going to be deleted, the system administrator may mark the library's entry state as "deleted", so that no new users will access the library, but current users can finish use of the library. If a base entry state is marked as "inactive" or "deleted" there must be another base entry to provide the default for the system.

Type 511 is used by base entries to indicate the type of this entry. This field may be used to identify the granularity of the software component managed, such as "program" or "library" or "routine". Since the registry structure is generic to manage multiple versions of a software component, whether it is a routine, a library or an executable program, this field may be used to indicate the granularity used.

Several structures use an UUID field 512. An extension structure uses it to indicate further capabilities provided by a version of the software library. A dependency structure uses it to indicate other software libraries that the software library depends on. A prerequisite structure uses it to indicate a previous version of a software library that must have been loaded by an application prior to using the base entry. All entry structures use the UUID to uniquely identify the software library indicated by the entry. Any of these fields may use a system of uniquely identifying a software unit. One way of uniquely identifying a software unit is to use the Universal Unique Identifier (UUID), a system of identification using a 128 bit unique value.

An entry structure has a version 513, which is used by base entries indicating the version number of the version of the software library in this entry.

Prerequisite pointer 514 is used by base entries. A prerequisite pointer points to a prerequisite structure indicating a previous version of the service.

Having illustrated and described the principles of our invention in a preferred embodiment thereof, it should be readily apparent to those skilled in the art that the invention can be modified in arrangement and detail without departing from such principles. We claim all modifications coming within the spirit and scope of the accompanying claims.

What is claimed is:

1. A software registry data structure stored in a machine readable medium for managing multiple versions of a software service used by an application running on a computer, the registry data structure comprising:

one or more base entries each indicating a version of the software service, each base entry including one or more rules, of which at least one rule of a base entry must be satisfied to use the corresponding version of the software service indicated by the base entry, so that the application utilizes the version of the software service corresponding to the base entry with the satisfied rule.

2. A software registry data structure according to claim 1, further including a default base entry, indicating a default version of the software service, wherein if all base entries fail to satisfy any of its rules then the default version of the software service is used.

3. A software registry data structure according to claim 1, whereby each rule for a base entry comprises one or more criteria, whereby each criterion of a rule must be met to satisfy the rule.

4. A software registry data structure according to claim 3, wherein all of the criteria for a rule are connected in a linked list.

5. A software registry data structure according to claim 1, whereby each version of the software service comprises a software library.

6. A software registry data structure according to claim 1, whereby each version of the software service comprises a software program.

7. A software registry data structure according to claim 1, whereby each version of the software service comprises a software procedure.

8. A software registry data structure according to claim 1, whereby each base entry:

an indication of the software service provided by the base entry;

a version indicator corresponding to a version of the software service; and a memory location corresponding to a version of the software service.

9. A software registry data structure according to claim 8, whereby each base entry further comprises:

a dependency, indicating a dependent software component, used by the corresponding version of the software service.

10. A software registry data structure according to claim 8, whereby each base entry further comprises:

a prerequisite, indicating an earlier version of the software service, needed to construct the corresponding version of the software service.

11. A software registry data structure according to claim 8, whereby each base entry further comprises:

a list of extensions, each extension indicating an additional software component providing an additional capability of the software service.

12. A software registry data structure according to claim 1, wherein all base entries are connected so as to form a linked list.

13. A software registry data structure according to claim 1, wherein all rules for a base entry are connected in a linked list.

14. A software system for managing multiple versions of a software service, the system comprising:

a digital computer with memory;

a software service available in a multiple versions, each version existing in the memory;

a software registry existing in the memory, the registry comprising one or more base entries, each base entry having at least one rule and each base entry corresponding to a version of the software service; and a software application existing in the memory and constructed and arranged to match at least one of the rules of a base entry and therefore using the version of the software service corresponding to the matching base entry.

15. A system according to claim 14, wherein the registry further comprises a default base entry corresponding to a default version of the software service, the software application constructed and arranged not to match any of the rules of any of the base entries and therefore use the default version of the software service.

16. A system according to claim 14, each rule of each base entry comprising at least one criterion, the software application constructed and arranged to meet all of the criterion of at least one rule of a base entry and therefore use the corresponding version of the software service.

17. A system according to claim 16, wherein the registry further comprises a default base entry corresponding to a default version of the software service; the software application constructed and arranged such not to match all of the criterion of any of the rules of any of the base entries and therefore use the default version of the software service.

18. A system according to claim 14, wherein each version of the software service comprises a software library.

19. A system according to claim 14, wherein each version of the software service comprises a software procedure.

20. A system according to claim 14, wherein each version of the software service comprises a software program.

21. A method for selecting a version of a software service for use by a software application using a registry, the registry comprising one or more base entries each corresponding to a version of the software service, each base entry comprising one or more rules, the method comprising the steps:

for each base entry testing each rule of the base entry;

selecting the version of the software service corresponding to the base entry if any rule of the base entry is satisfied.

22. A method according to claim 21, wherein the registry further comprises a default base entry corresponding to a default version of the software service, the method further comprising the step:

selecting the default version of the software service, if no rule of any base entry is satisfied.

23. A method according to step 21, each rule of each base entry comprises one or more criteria, whereby the step of testing each rule of the base entry comprises the steps of:

testing all criteria of the rule;

if all criteria are satisfied, satisfying the rule, otherwise not satisfying the rule.

24. A method for deleting a version of a software service using a registry, the software service available in a first version and a second version, the registry comprising a first base entry and a second base entry, each base entry comprising a state, the method comprising the steps of:

marking the state of the first base entry corresponding to the first version of the software service as deleted;

redirecting an original access to the first version of the software service to the second version of the software service because the first base entry has a state of deleted; and allowing an on-going access to the first version of the software service to allow a user of the software service to finish its use of the first version of the software service even though the first base entry has a state of deleted.

25. A software registry data structure stored in a machine readable medium for use in a replaceable software system by an application running on a computer, the data structure comprising:

a series of entries, each entry associated with a respective software library, and at least one of the entries comprising:

a first element for storing an identification of the corresponding software library;

a second element for storing an indication of a current version of the corresponding software library;

a third element for storing a location of the corresponding software library; and a fourth element for storing one or more rules controlling the use of the corresponding software library, so that the application uses the current version of the corresponding software library when the rules controlling the use of the corresponding software library are satisfied.

26. A software registry data structure according to claim 25 wherein the said entry further includes an indication of a pending request to update the corresponding software library.

27. A software registry data structure according to claim 25 wherein the said entry further includes an indication that the corresponding software library has been updated.

28. A software registry data structure according to claim 25 wherein a second of the entries comprises the first, second, and third elements, the second of the entries having no rules controlling the use of the corresponding software library.

* * * * *